United States Patent
Uwai et al.

(10) Patent No.: US 12,282,631 B2
(45) Date of Patent: Apr. 22, 2025

(54) ELECTRONIC APPARATUS HAVING VARIABLE DETECTION SENSITIVITY AREA DUE TO PROGRESS OF NEAR-FIELD COMMUNICATION ANTENNA AND DRIVING METHOD

(71) Applicant: PANASONIC INTELLECTUAL PROPERTY MANAGEMENT CO., LTD., Osaka (JP)

(72) Inventors: Shuto Uwai, Kanagawa (JP); Yusaku Shoda, Kanagawa (JP); Daiki Kano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/441,750

(22) Filed: Feb. 14, 2024

(65) Prior Publication Data
US 2024/0345684 A1 Oct. 17, 2024

(30) Foreign Application Priority Data
Apr. 12, 2023 (JP) .................. 2023-065135

(51) Int. Cl.
| G06F 3/041 | (2006.01) |
| G06F 3/04886 | (2022.01) |
| G06K 7/00 | (2006.01) |
| G06Q 20/32 | (2012.01) |
| G06Q 20/34 | (2012.01) |
| H01Q 1/22 | (2006.01) |
| H04B 5/70 | (2024.01) |

(52) U.S. Cl.
CPC ...... *G06F 3/04186* (2019.05); *G06F 3/04886* (2013.01); *G06K 7/0004* (2013.01); *G06Q 20/3278* (2013.01); *G06Q 20/341* (2013.01); *H01Q 1/22* (2013.01); *H04B 5/70* (2024.01)

(58) Field of Classification Search
CPC .................................................. G06F 3/04186
USPC ........................................................ 345/173
See application file for complete search history.

(56) References Cited

U.S. PATENT DOCUMENTS

| 2014/0253963 A1 | 9/2014 | Aoyama |
| 2017/0371491 A1 | 12/2017 | Horikoshi et al. |
| 2018/0039815 A1* | 2/2018 | Jung ............. G06F 3/044 |

(Continued)

FOREIGN PATENT DOCUMENTS

| JP | 2008-265544 | 11/2008 |
| JP | 2014-170443 | 9/2014 |
| JP | 2014-232985 | 12/2014 |

(Continued)

*Primary Examiner* — Long D Pham
(74) *Attorney, Agent, or Firm* — Greenblum & Bernstein, P.L.C.

(57) ABSTRACT

An electronic apparatus includes a touch panel for electrically detecting an input operation, an antenna for near-field communication having a communicable area that overlaps at least a part of a detection area of the touch panel, a memory storing instructions, and a processor that implements the instructions to reduce a detection sensitivity in a first detection area overlapping with the communicable area in the touch panel when a near-field communication is in progress by the antenna for near-field communication or when a near-field communication is possible by the antenna for near-field communication.

7 Claims, 9 Drawing Sheets

(56) References Cited

U.S. PATENT DOCUMENTS

2021/0110130 A1* 4/2021 Kim .................. G06V 40/1347
2023/0244336 A1 8/2023 Uwai et al.

FOREIGN PATENT DOCUMENTS

| JP | 2017-228173 | 12/2017 |
| JP | 7122709 | 8/2022 |

* cited by examiner

200) # ELECTRONIC APPARATUS HAVING VARIABLE DETECTION SENSITIVITY AREA DUE TO PROGRESS OF NEAR-FIELD COMMUNICATION ANTENNA AND DRIVING METHOD

CROSS-REFERENCE TO RELATED APPLICATIONS

This application is based on and claims priority under 35 USC 119 from Japanese Patent Application No. 2023-065135 filed on Apr. 12, 2023, the contents of which are incorporated herein by reference.

TECHNICAL FIELD

The present disclosure relates to an electronic apparatus and a method for controlling an electronic apparatus.

BACKGROUND ART

In the related art, a vehicle-mounted touch panel is known in which a sensing area is set in a predetermined area. The touch panel includes a control unit that switches and controls the sensing area between two states, which are a normal state and a state in which the area of the sensing area is enlarged from the normal state (see Patent Literature 1).

CITATION LIST

Patent Literature

Patent Literature 1: JP2008-265544A

SUMMARY OF INVENTION

When the touch panel in Patent Literature 1 is provided at a position close to an antenna for near-field communication, a communication radio wave or the like may interfere with a capacitance value of the touch panel during the operation of the antenna for near-field communication. Therefore, an erroneous operation may occur in the touch panel.

The present disclosure provides an electronic apparatus and a method for controlling an electronic apparatus that can prevent an erroneous operation of a touch panel even when an antenna for near-field communication is provided in the vicinity of the touch panel.

One aspect of the present disclosure provides an electronic apparatus including a touch panel for electrically detecting an input operation, an antenna for near-field communication having a communicable area that overlaps at least a part of a detection area of the touch panel, a memory storing instructions, and a processor that implements the instructions to reduce a detection sensitivity in a first detection area overlapping with the communicable area in the touch panel when a near-field communication is in progress by the antenna for near-field communication or when a near-field communication is possible by the antenna for near-field communication.

Further, another aspect of the present disclosure a method for controlling an electronic apparatus including a touch panel for electrically detecting an input operation and an antenna for near-field communication having a communicable area that overlaps at least a part of a detection area of the touch panel. The method includes a step of reducing a detection sensitivity in a first detection area overlapping with the communicable area in the touch panel when a near-field communication is in progress by the antenna for near-field communication or when a near-field communication is possible by the antenna for near-field communication.

According to the present disclosure, the position of the medium can be easily guided to the camera that captures an image of the code displayed on the medium at the time of code settlement.

DESCRIPTION OF EMBODIMENTS

Hereinafter, an embodiment will be described in detail with reference to the drawings as appropriate. However, the unnecessarily detailed description may be omitted. For example, the detailed description of well-known matters and the redundant description of substantially the same configuration may be omitted. This is to avoid unnecessary redundancy of the following description and to facilitate understanding of those skilled in the art. It should be noted that the accompanying drawings and the following description are provided for those skilled in the art to fully understand the present disclosure, and are not intended to limit the subject matter described in the claims.

Figure 1:
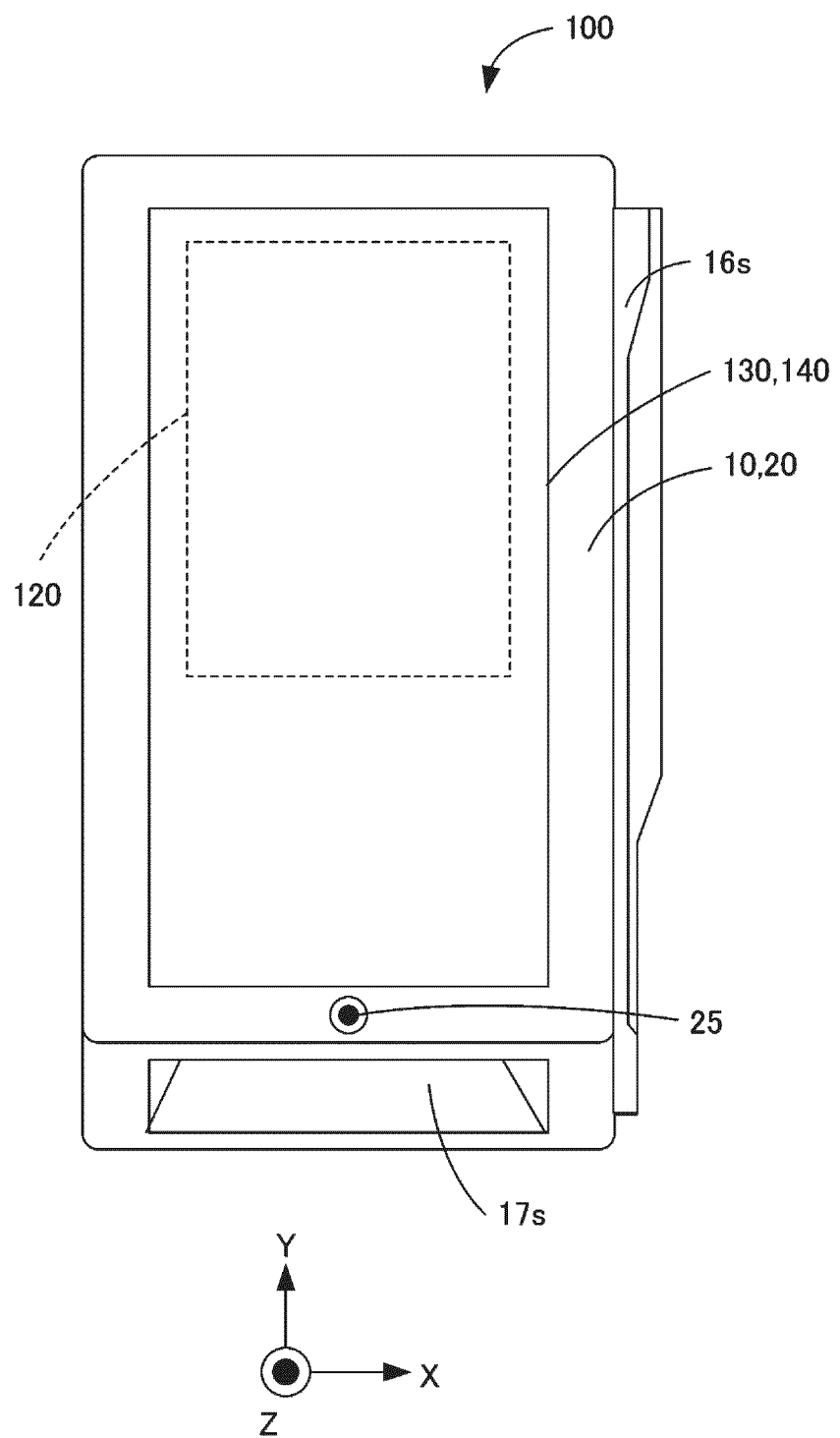
FIG. 1 is an overall configuration diagram of an electronic apparatus including a touch panel according to an embodiment of the present disclosure.

FIG. 1 is an overall configuration diagram of an electronic apparatus including a touch panel according to an embodiment of the present disclosure. In the drawings, an X direction is one direction (for example, a lateral direction) along a touch panel surface, and a Y direction is a direction perpendicular to the X direction along the touch panel surface. A Z direction is a direction perpendicular to the touch panel surface.

An electronic apparatus 100 includes an enclosure 10, a protective plate 20, an antenna for near field communication (NFC) 120, a touch panel 130, and a liquid crystal display (LCD) module 140. The electronic apparatus 100 includes a first card slot 16*s*, a second card slot 17*s*, and a camera 25. The electronic apparatus 100 is, for example, a settlement processing apparatus that executes settlement processing.

The electronic apparatus 100 is a complex type that allows a purchaser of a product or the like to select a plurality of settlement methods. The plurality of settlement methods include, for example, credit card settlement, electronic money settlement, code (for example, QR code (registered trademark)) settlement, and cash settlement. The credit card settlement includes, for example, magnetic card settlement, contact IC card settlement, and non-contact IC card settlement. The electronic money may include a plurality of types of electronic money. Since the electronic money settlement and the non-contact IC card settlement are executed using a non-contact communication (for example, a near-field communication (NFC)), the electronic money settlement and the non-contact IC card settlement are collectively referred to as non-contact settlement here.

The plurality of settlement methods are executed using a plurality of corresponding settlement interfaces. The plurality of settlement interfaces include, for example, a credit card, an electronic money card C32, a code, and cash. The credit card includes, for example, a magnetic card C1, a contact IC card C2, and a non-contact IC credit card C31.

The magnetic card C1 is inserted into a first card slot 16s and used for settlement. The contact IC card C2 is inserted into a second card slot 17s and used for settlement. The non-contact IC credit card C31 and the electronic money card C32 are brought close to an NFC antenna 120 and used for settlement. The non-contact IC credit card C31 and the electronic money card C32 are collectively referred to as a "non-contact IC card C3".

The enclosure 10 constitutes the exterior of the electronic apparatus 100 and houses other components. In FIGS. 2B and 2C, only the protective plate 20 is shown, and the enclosure 10 is not shown. The protective plate 20 is provided on the upper surface of the touch panel 130 to protect the touch panel 130.

The NFC antenna 120 is a communication antenna used for a near-field communication (an antenna for near-field communication). The NFC antenna 120 detects a communication medium such as a non-contact IC card or a high frequency identification device tag by a near-field communication, and wirelessly communicates with the detected communication medium. The NFC antenna 120 executes a near-field communication with, for example, the non-contact IC card C3, which is a communication medium adjacent to the electronic apparatus 100, and transmits and receives information. The electronic apparatus 100 may read information of the non-contact IC card C3 via the NFC antenna 120, or write information to the non-contact IC card C3. In the present embodiment, the non-contact IC card C3 is mainly illustrated as a communication medium.

For example, the user holds the non-contact IC card C3 communicable with the NFC antenna 120, and brings the non-contact IC card C3 close to the electronic apparatus 100. Accordingly, non-contact wireless communication is executed between the non-contact IC card C3 and the NFC antenna 120, and information related to settlement and the like are transmitted and received.

The touch panel 130 provides a user interface that electrically detects the input executed by the finger of a user or a pointer such as a stylus pen. The touch panel 130 may be of various types such as a resistive film type or a capacitive type, but the type thereof is not particularly limited. The touch panel 130 receives an input operation of various types of data and information (for example, selection of a settlement method, a personal identification number (PIN), or an electronic signature) related to settlement processing executed by a store clerk or a customer, and detects this input. The touch panel 130 is provided in the vicinity of the NFC antenna 120. For example, at least a part of a detection area DR of the touch panel 130 and a communicable area NR of the NFC antenna 120 overlap each other (see FIG. 4A to be described later).

The LCD module 140 is a so-called liquid crystal display device, and includes various members such as a liquid crystal cell and a polarizing plate, but the type thereof is not particularly limited. Another display device (for example, an organic electroluminescence) may be used instead of the LCD module 140. The LCD module 140 displays, for example, various types of data and information related to the settlement processing.

The electronic apparatus 100 may be an apparatus (a stationary type) whose installation position is fixed, or may be an apparatus (a portable type or a handheld type) that can be carried around by the user. The non-contact IC card C3 may be embedded in the apparatus whose installation position is fixed, and the electronic apparatus 100 that can be carried around by the user may be brought close to the portion of the non-contact IC card C3. The electronic apparatus 100 may have the same size as, for example, a smartphone. In the electronic apparatus 100, for example, the enclosure 10 is rectangular in plan view, and may have another shape. The NFC antenna 120 is, for example, rectangular in plan view, and may have another shape.

Figure 2A:
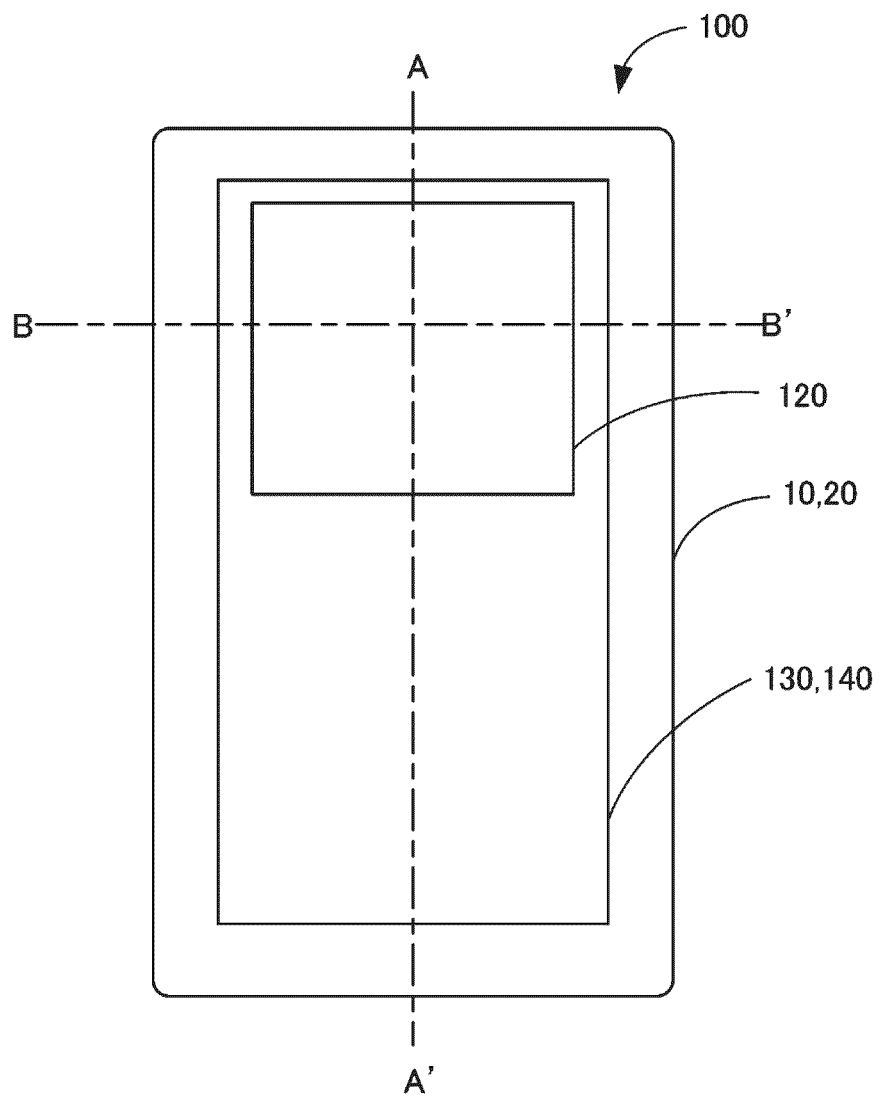
FIG. 2A is an overall configuration diagram of the electronic apparatus with a part of the configuration omitted.
Figure 2B:
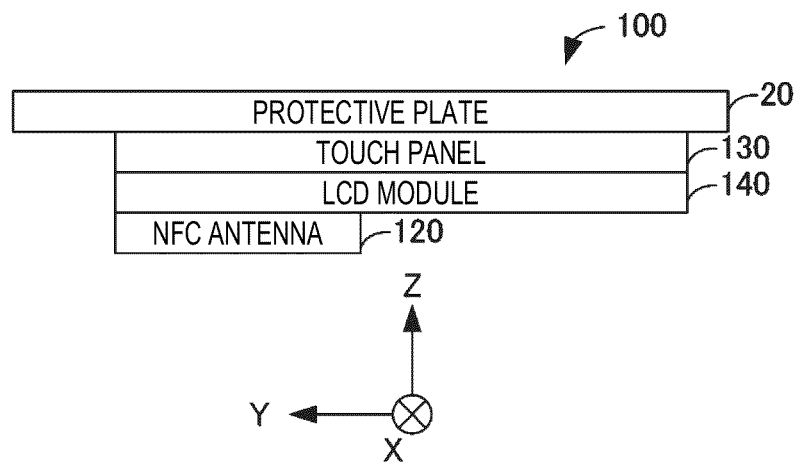
FIG. 2B is a cross-sectional view taken along a line A-A' in FIG. 2A.
Figure 2C:
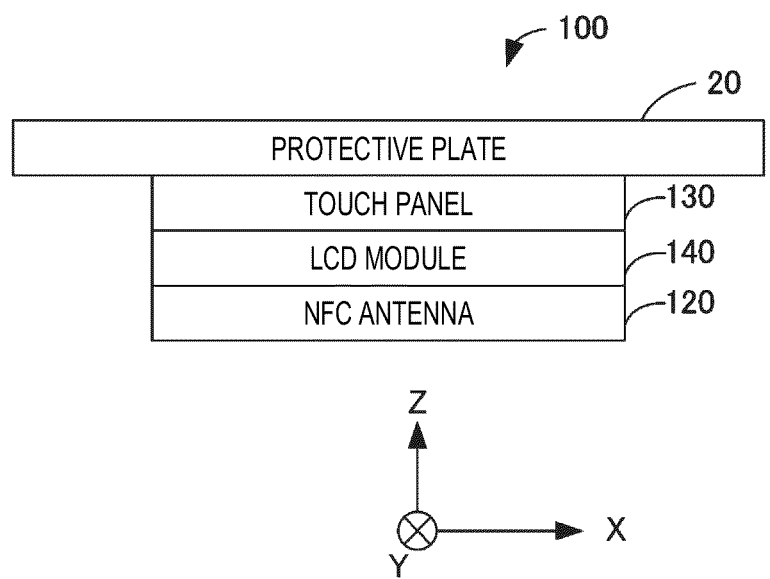
FIG. 2C is a cross-sectional view taken along a line B-B' in FIG. 2A.

FIG. 2A is an overall configuration diagram of the electronic apparatus 100 with a part of the configuration (for example, the first card slot 16s, the second card slot 17s, and the camera 25) omitted. FIG. 2B is a cross-sectional view taken along a line A-A' in FIG. 2A. FIG. 2C is a cross-sectional view taken along a line B-B' in FIG. 2A. As shown in FIGS. 2B and 2C, the protective plate 20, the touch panel 130, the LCD module 140, and the NFC antenna 120 are arranged in this order from the positive side (the upper side) in the Z direction.

Figure 3:
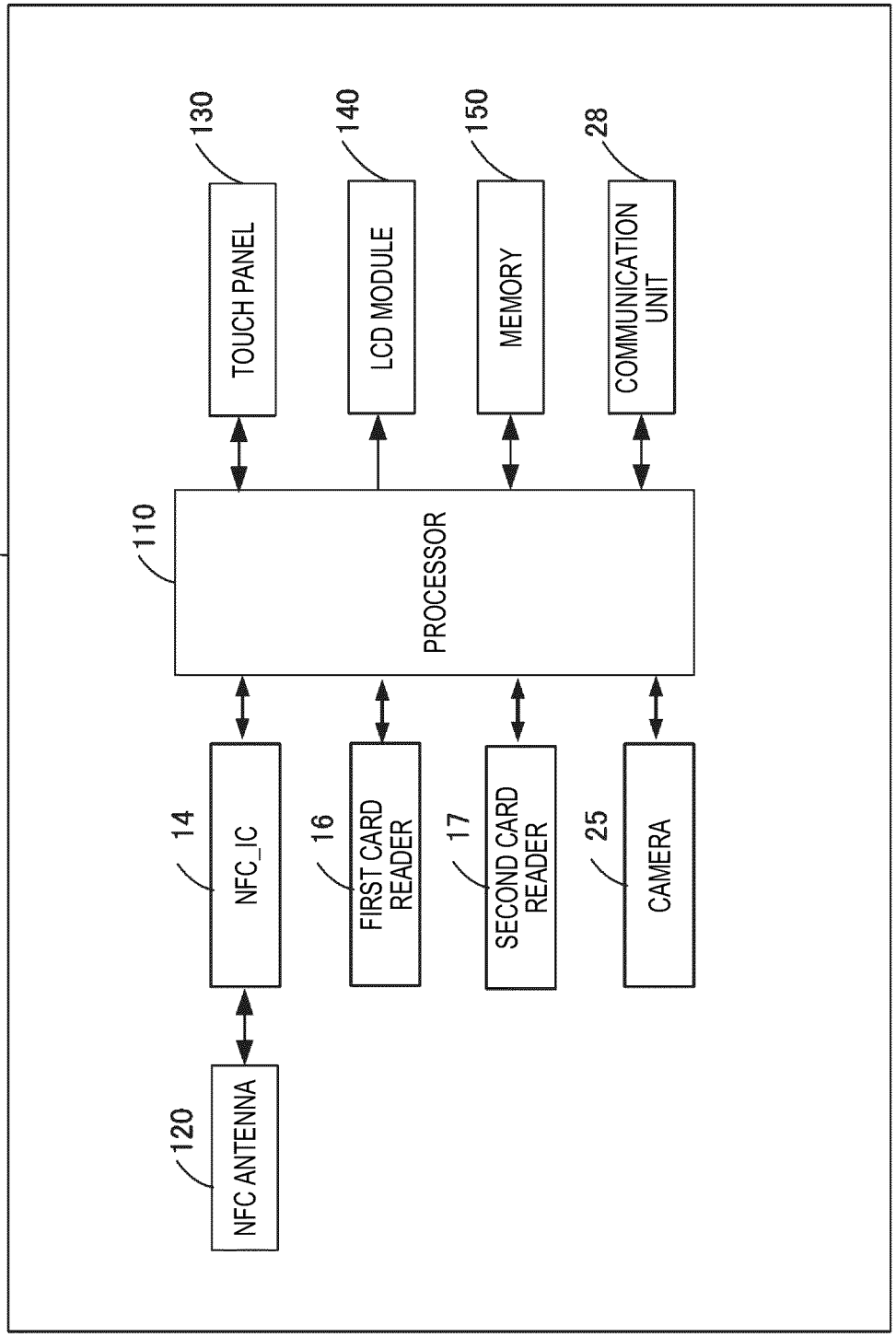
FIG. 3 is a block diagram showing a configuration example of the electronic apparatus.

FIG. 3 is a block diagram showing a configuration example of the electronic apparatus 100. The electronic apparatus 100 includes a processor 110, the NFC antenna 120, the touch panel 130, the LCD module 140, and a memory 150. The electronic apparatus 100 further includes an NFC_IC 14, a first card reader 16, a second card reader 17, the camera 25, and a communication unit 28.

The processor 110 implements various functions by executing a program stored in the memory 150. The processor 110 may include a micro processing unit (MPU), a central processing unit (CPU), a digital signal processor (DSP), or the like. The processor 110 may be implemented by various integrated circuits (for example, a large scale integration (LSI) or a field programmable gate array (FPGA)). The processor 110 integrally controls the units of the electronic apparatus 100 and executes various types of processing.

The processor 110 executes processing related to settlement according to various settlement methods (for example, credit card settlement, electronic money settlement, code settlement, or cash settlement). The code settlement is settlement using a code such as a two-dimensional code. The processor 110 controls a detection state, a detection range, a detection sensitivity, or the like of the touch panel 130 according to a predetermined condition.

The memory 150 stores various types of data, information, programs, and the like. The memory 150 includes a primary storage device (for example, a random access memory (RAM) or a read only memory (ROM)), and is, for example, a flash memory. The memory 150 may include a memory other than the primary storage device.

The NFC_IC 14 executes processing for the NFC antenna 120. For example, the NFC_IC 14 controls power supply to the NFC antenna 120 and data communication via the NFC antenna 120. That is, the NFC_IC 14 is an example of an antenna control circuit.

The NFC_IC 14 acquires (reads) information held by the non-contact IC credit card C31 via the NFC antenna 120. The NFC_IC 14 transmits this information to the processor 110 as non-contact read information. The information held by the non-contact IC credit card C31 and the non-contact read information include, for example, the identification number of the credit card. The NFC_IC 14 acquires (reads) information held by the electronic money card C32 via the NFC antenna 120. The NFC_IC 14 transmits this information to the processor 110 as electronic money read information. The information held by the electronic money card C32 and the electronic money read information include, for example, the identification number of the electronic money card C32.

The NFC antenna 120 is formed of, for example, a loop coil. The NFC antenna 120 receives power supply from the NFC_IC 14 and generates a radio wave. An area within a predetermined distance from the NFC antenna 120 is a communicable area in which non-contact communication with the NFC antenna 120 is possible. When the non-contact IC card C3 is provided in the communicable area, the radio wave from the NFC antenna 120 reaches the non-contact IC card C3, and the NFC antenna 120 applies the activation power to the non-contact IC card C3. Accordingly, the NFC antenna 120 communicates data with the non-contact IC card C3.

The first card reader 16 is a magnetic card reader. The first card reader 16 reads information held by the magnetic card C1 and transmits the read information as magnetic read information to the processor 110. The information held by the magnetic card C1 and the magnetic read information include, for example, the identification number of the credit card.

The second card reader 17 is a contact IC card reader. The second card reader 17 reads information held by the contact IC card C2 and transmits the read information as contact read information to the processor 110. The information held by the contact IC card C2 and the contact read information include, for example, the identification number of the credit card.

The camera 25 captures an image of a subject, and obtains a captured image. The camera 25 captures an image of a code (for example, a two-dimensional code) displayed on a mobile terminal of a purchaser, and transmits the captured image to the processor 110. The processor 110 analyzes the captured image, and recognizes identification information necessary for settlement indicated by the two-dimensional code or the like. The mobile terminal is, for example, a smartphone, a tablet terminal, or another mobile terminal, and has a display surface that displays a code.

The communication unit 28 communicates with an external device (for example, a point of sale (POS) or a cash drawer) by wire or wirelessly. The communication unit 28 may execute communication via, for example, a universal serial bus (USB) cable or a local area network (LAN) cable, or may execute communication via a wireless LAN, a wireless wide area network (WAN), or a mobile phone network.

Next, the specific configuration and input detection of the touch panel 130 will be described.

On the touch panel surface of the touch panel 130, detection points for detecting the input are arranged in a grid pattern. For example, the detection points are arranged in a grid pattern along the X direction and the Y direction in FIG. 1. The detection points can detect the input. The detection points may be arranged in a shape other than the grid pattern.

The touch panel 130 can adjust the detection sensitivity for detecting the input. In this case, the touch panel 130 may adjust the detection sensitivity for each detection point. When adjusting the detection sensitivity, the sensitivity may be selected from two sensitivities which are a detectable state (a validation state) and an undetectable state (an invalidation state), that is, it may be possible to select whether the input detection function of the touch panel 130 is turned on or off. When adjusting the detection sensitivity, the strength of the detection sensitivity may be adjustable in multiple stages. The undetectable invalidation state may include not executing the detection itself, or executing the detection itself but not using the detection result for other processing.

The touch panel 130 may have a plurality of divided detection areas SDR by dividing a detection area DR in which the input can be detected into a plurality of detection areas DR. For example, the touch panel 130 may have a divided detection area SDR1 and a divided detection area SDR2. The number of divided detection areas SDR may not be two, and may be three or more.

The divided detection area SDR1 may be an area the NFC antenna 120 on the touch panel 130. The detection points in the divided detection area SDR1 are within the communicable area NR in which a near-field communication executed by the NFC antenna 120 is possible. Therefore, if the detection of electrical input in the divided detection area SDR1 and the near-field communication executed by the NFC antenna 120 are executed at the same time, electrical interference may occur.

On the other hand, the divided detection area SDR2 may be an area separated from the NFC antenna 120 on the touch panel 130. The detection points in the divided detection area SDR2 are outside the communicable area NR in which the near-field communication executed by the NFC antenna 120 is possible. Therefore, even if the detection of electrical input in the divided detection area SDR2 and the near-field communication executed by the NFC antenna 120 are executed at the same time, electrical interference does not occur.

Figure 4A:
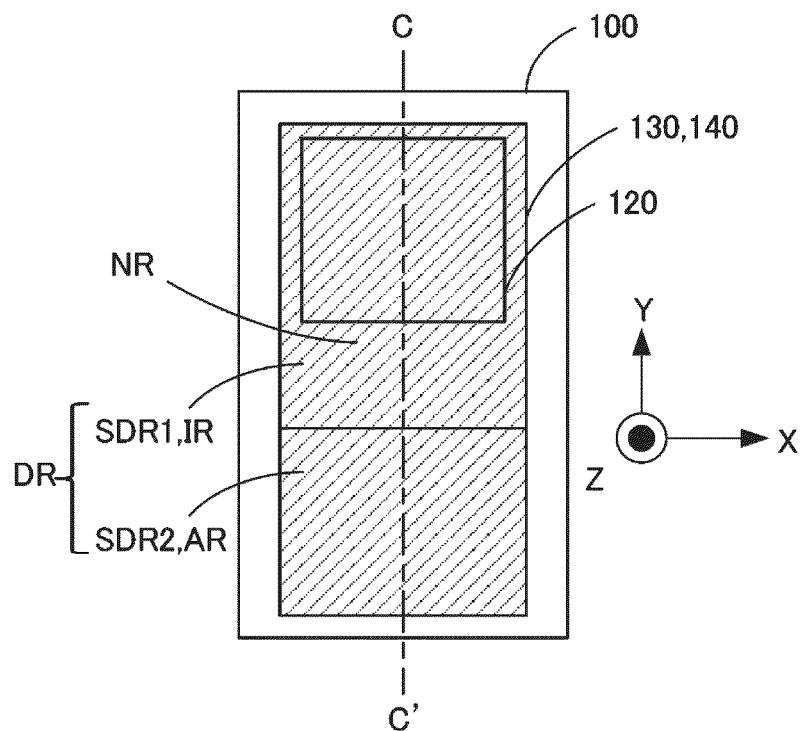
FIG. 4A is a top view of the electronic apparatus showing that a validation area of the touch panel is the entire area of the touch panel.

As shown in FIG. 4A to be described later, the divided detection area SDR1 may not be aligned with the outer periphery of the area surrounded by the NFC antenna 120 in the X direction and the Y direction. For example, the radio wave of the near-field communication executed by the NFC antenna 120 may reach the area even slightly outside the rectangular area surrounded by the NFC antenna 120. Therefore, the divided detection area SDR1 may be determined such that the area within a predetermined distance from the area surrounded by the NFC antenna 120 is included in the divided detection area SDR1. That is, the touch panel 130 may ensure the clearance by ensuring that the validation range in which the input can be detected at a predetermined timing does not overlap with the arrangement position of the NFC antenna 120. The position of each of the divided detection areas SDR in the touch panel 130 may be determined in advance, or a range desired by the user may be freely selected based on the input to the touch panel 130, for example.

According to the timing, the touch panel 130 may switch between a state in which the divided detection areas SDR are a validation area in which the input can be detected and a state in which the divided detection areas SDR are an invalidation area in which the input cannot be detected. A collection of detection points in the validation state serves as a validation area in which the input in the touch panel 130 can be detected. For example, when the detection points in the divided detection area SDR1 are in the validation state, the divided detection area SDR1 is a validation area. When the detection points in the divided detection area SDR1 are in the invalidation state, the divided detection area SDR1 is an invalidation area. The electronic apparatus 100 can achieve both a near-field communication using the NFC antenna 120, the input detection executed by the touch panel 130, and the prevention of the electrical interference between the NFC antenna 120 and the touch panel 130 by switching the divided detection area SDR1 between the validation area or the invalidation area.

As described above, the detection of the electrical input of the touch panel 130 in the divided detection area SDR2 does not electrically interfere with the near-field communication executed by the NFC antenna 120. Therefore, during the operation of the touch panel 130, the detection points in the divided detection area SDR2 may always be in the validation state, that is, the divided detection area SDR2 may always be a validation area. In this way, the validation area of the touch panel 130 may be variable depending on a predetermined condition.

Next, a specific processing example of the processor 110 will be described.

The processor 110 may change the detection state of the touch panel 130 based on whether a near-field communication is being executed by the NFC antenna 120. Changing the detection state of the touch panel 130 may include changing the validation area of the touch panel 130 and changing the detection sensitivity of the touch panel 130.

For example, when a near-field communication is being executed by the NFC antenna 120, the processor 110 may determine the validation area of the touch panel 130 such that the divided detection area SDR1 is an invalidation area and the divided detection area SDR2 is a validation area. For example, the processor 110 may control the touch panel 130 such that the input is not detected in the divided detection area SDR1 and the input is detected in the divided detection area SDR2.

For example, when a near-field communication is not being executed by the NFC antenna 120, the processor 110 may determine the validation area of the touch panel 130 such that the divided detection area SDR1 is a validation area and the divided detection area SDR2 is a validation area. That is, the processor 110 may control the touch panel 130 such that the input is detected over the entire detection area DR including both the divided detection area SDR1 and the divided detection area SDR2.

When a near-field communication is being executed by the NFC antenna 120, rather than invalidating the input detection in the divided detection area SDR1, the processor 110 may simply reduce the detection sensitivity in the divided detection area SDR1. Accordingly, the electronic apparatus 100 can reduce the electrical interference between the near-field communication executed by the NFC antenna 120 and the input detection executed by the touch panel 130, and can reduce the erroneous operation of the touch panel 130.

The processor 110 may set the operation mode of the electronic apparatus 100. The operation modes of the electronic apparatus 100 include at least an NFC mode in which NFC communication is possible and a non-NFC mode in which NFC communication is not possible. In the NFC mode, the NFC antenna 120 executes polling for a near-field communication, and transmits the radio wave. In the non-NFC mode, the NFC antenna 120 does not execute polling for a near-field communication, and does not transmit the radio wave. The setting information of the operation mode is stored in the memory 150.

The processor 110 may change the detection state of the touch panel 130 based on whether the operation mode is the NFC mode or the non-NFC mode. For example, when the operation mode is the NFC mode, the processor 110 may determine the validation area of the touch panel 130 such that the divided detection area SDR1 is an invalidation area and the divided detection area SDR2 is a validation area. For example, when the operation mode is the non-NFC mode, the processor 110 may determine the validation area of the touch panel 130 such that the divided detection area SDR1 is a validation area and the divided detection area SDR2 is a validation area.

When the operation mode is set to the NFC mode, there is a high chance that a near-field communication using the NFC antenna 120 is to be executed. Therefore, the electronic apparatus 100 can prevent the erroneous operation of the touch panel 130 by changing the validation area of the touch panel 130 at this stage.

The processor 110 may change the detection state of the touch panel 130 based on whether a specific settlement method is selected. For example, when the settlement method using the near-field communication executed by the NFC antenna 120 is selected, the processor 110 may determine the validation area of the touch panel 130 such that the divided detection area SDR1 is an invalidation area and the divided detection area SDR2 is a validation area. For example, when the settlement method not using the near-field communication executed by the NFC antenna 120 is selected, the processor 110 may determine the validation area of the touch panel 130 such that the divided detection area SDR1 is a validation area and the divided detection area SDR2 is a validation area. The settlement methods using the near-field communication executed by the NFC antenna 120 may include, for example, credit card settlement and electronic money settlement.

When the settlement method using the near-field communication executed by the NFC antenna 120 is selected, there is a high chance that near-field communication using the NFC antenna 120 is to be executed. Therefore, the electronic apparatus 100 can prevent the erroneous operation of the touch panel 130 by changing the validation area of the touch panel 130 at this stage.

The erroneous operation of the touch panel 130 is, for example, the erroneous detection of the input executed by the touch panel 130, and may be the detection of information that has not been received or the failure to detect information that has been received. Since the electronic apparatus 100 can automatically change the detection state attained by the touch panel 130 based on the determination of the processor 110 without requiring the operation of the user, the convenience for the user is improved.

Next, an example of the validation area in the touch panel 130 will be described.

Figure 4B:
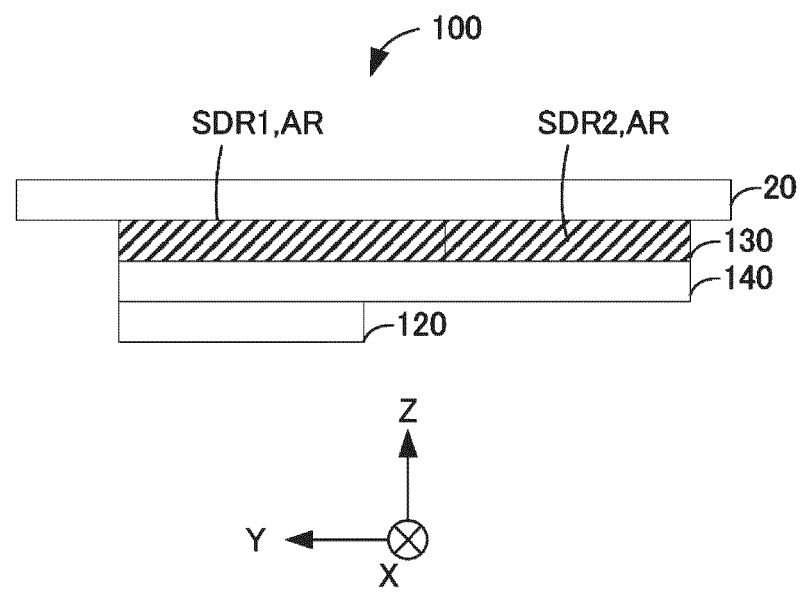
FIG. 4B is a cross-sectional view taken along a line C-C' in FIG. 4A.

FIG. 4A is a top view showing that a validation area AR of the touch panel 130 is the entire area of the touch panel 130. FIG. 4B is a cross-sectional view taken along a line C-C' in FIG. 4A.

In FIGS. 4A and 4B, the divided detection area SDR1 located on the positive side of the touch panel 130 in the Y direction and the divided detection area SDR2 located on the positive side of the touch panel 130 in the X direction are both the validation area AR. In this case, the input operations to the divided detection area SDR1 and the divided detection area SDR2 are detected and treated as the input, that is, the input is validated.

Figure 5A:
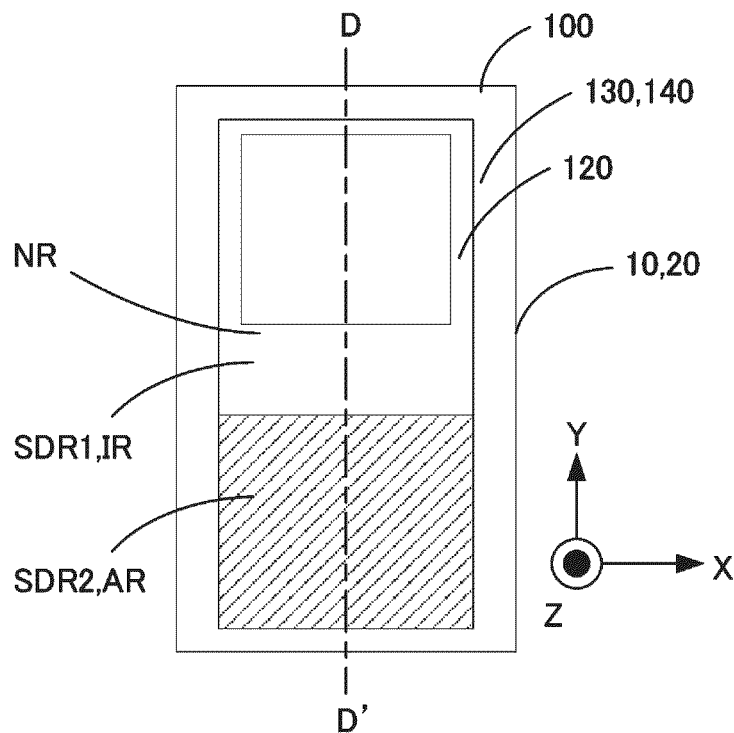
FIG. 5A is a top view of the electronic apparatus showing that a validation area of the touch panel is a partial area of the touch panel.
Figure 5B:
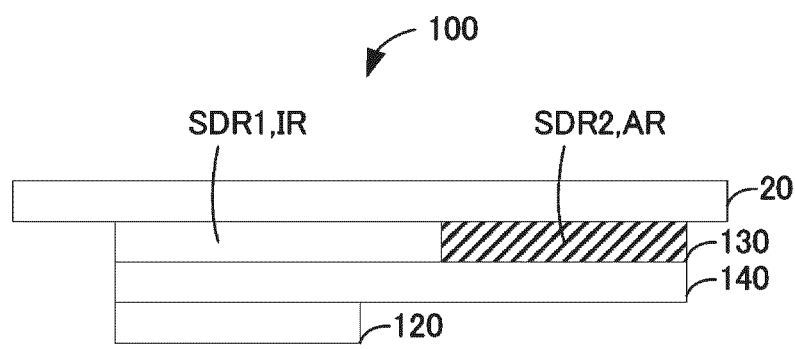
FIG. 5B is a cross-sectional view taken along a line D-D' in FIG. 5A.
Figure 5B:
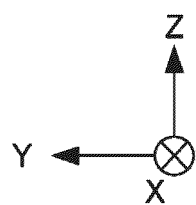

FIG. 5A is a top view showing that the validation area AR of the touch panel 130 is a partial area of the touch panel 130. FIG. 5B is a cross-sectional view taken along a line D-D' in FIG. 5A.

In FIGS. 5A and 5B, the divided detection area SDR2 located on the negative side of the touch panel 130 in the Y direction is the validation area AR, and the divided detection area SDR1 located on the positive side of the touch panel 130 in the Y direction, that is, in the vicinity of the NFC antenna 120 is an invalidation area IR. In this case, the input operation to the divided detection area SDR1 is not detected, or the input operation to the divided detection area SDR1 is not treated as the input, that is, the input is invalidated. On the other hand, the input operation to the divided detection area SDR2 is detected and treated as the input, that is, the input is validated.

In FIGS. 5A and 5B, the range of the validation area AR of the touch panel 130 is approximately ½ or ⅓ in the Y direction, and may be a range of other proportions.

Figure 6:
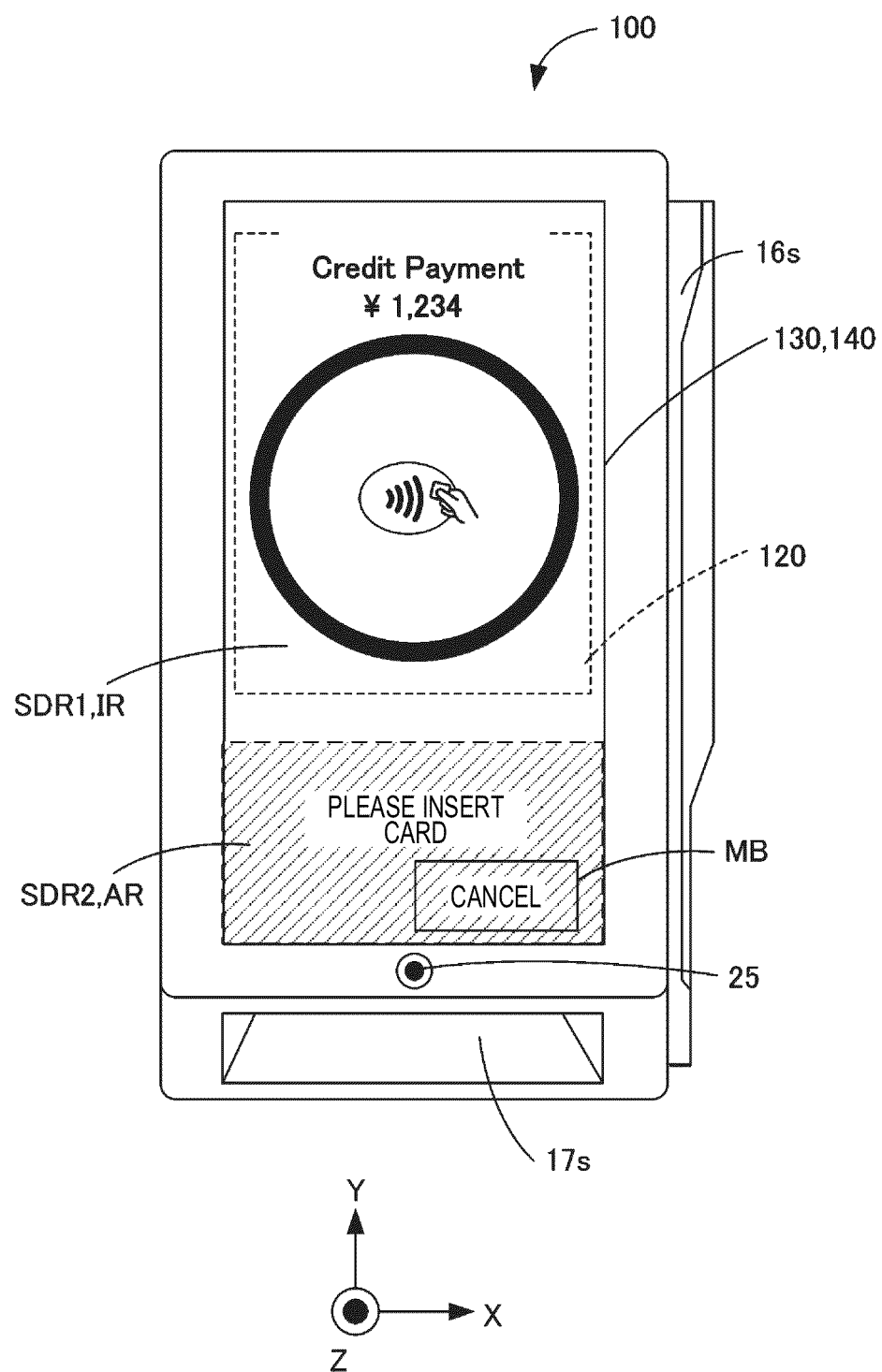
FIG. 6 is a diagram showing a display example of an operation button in the electronic apparatus.

FIG. 6 is a diagram showing a display example of an operation button in the electronic apparatus 100.

FIG. 6 shows a state in which the electronic apparatus 100 is executing the settlement processing and the divided detection area SDR1 is the invalidation area IR. In FIG. 6, an operation button MB is not provided in the divided detection area SDR1, and the operation button MB (for example, a cancel button) is displayed in the divided detection area SDR2. For example, regardless of the communication state of the NFC antenna 120, that is, normally, the operation button MB may not be displayed in the divided detection area SDR1, and the operation button MB may be displayed in the divided detection area SDR2. It may be changed such that, when the NFC antenna 120 is not communicating, the operation button MB is displayed in the divided detection area SDR1, and when the NFC antenna 120 is communicating, the operation button MB is displayed in the divided detection area SDR1. The display of the operation button MB may be changed by the processor 110.

That is, the processor 110 may change the display position and layout of the operation button MB based on the communication state of the NFC antenna 120. In this case, the processor 110 may execute control such that the operation button MB is redisplayed in the divided detection area SDR2 which is the validation area AR. Accordingly, when the validation area AR is changed, the electronic apparatus 100 can also ensure a state in which the operation button MB is always displayed in the validation area AR and the operation of the operation button MB is possible.

Next, an operation example of the electronic apparatus 100 will be described.

Figure 7:
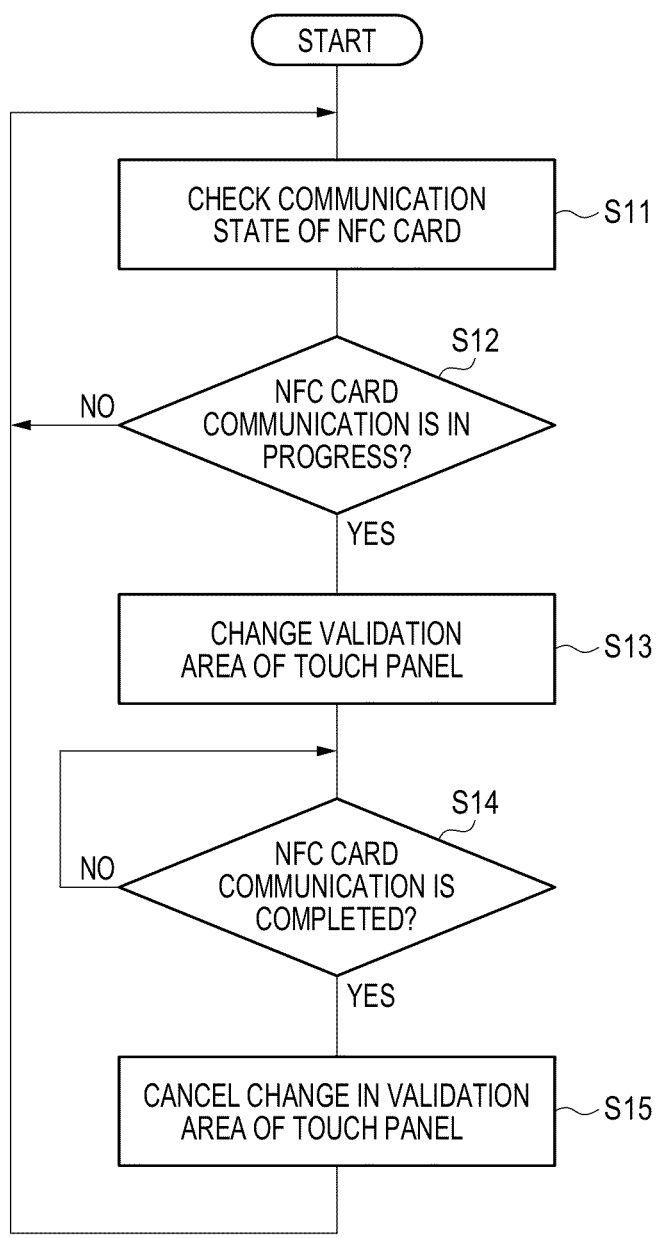
FIG. 7 is a flowchart showing a first operation example of the electronic apparatus.

FIG. 7 is a flowchart showing a first operation example of the electronic apparatus 100.

First, the processor 110 checks the communication state of the non-contact IC card C3 (S11). In this case, the processor 110 determines whether the NFC antenna 120 is communicating with the non-contact IC card C3 (whether a near-field communication is in progress) (S12).

When it is determined that the NFC antenna 120 is communicating with the non-contact IC card C3, the processor 110 changes the validation area AR of the touch panel 130 (S13). In this case, the processor 110 changes the divided detection area SDR1 from the validation area AR to the invalidation area IR. That is, the processor 110 changes a state in which both the divided detection area SDR1 and the divided detection area SDR2 are the validation area AR to a state in which only the divided detection area SDR2 is the validation area AR.

The processor 110 determines whether the NFC antenna 120 has completed the communication with the non-contact IC card C3 (S14). When it is determined that the communication with the non-contact IC card C3 has been completed, the processor 110 cancels the change in the validation area AR of the touch panel 130 (S15). In this case, the processor 110 changes the divided detection area SDR1 from the invalidation area IR to the validation area AR. That is, the processor 110 changes a state in which only the divided detection area SDR2 is the validation area AR to a state in which both the divided detection area SDR1 and the divided detection area SDR2 are the validation area AR.

After the processing in step S15, the processor 110 proceeds to the processing in step S11 again, and repeats the processing in FIG. 7.

According to the first operation example of the electronic apparatus 100, when it is detected that the communication state of the NFC antenna 120 has transitioned during the communication with the NFC 200, for example, the electronic apparatus 100 can prevent the electrical interference between the input detection executed by the touch panel 130 and the near-field communication executed by the NFC antenna 120 by changing the validation area AR of the touch panel 130. When it is detected that the communication state of the NFC antenna 120 has transitioned to the communication completion state in which the communication with the NFC 200 has been completed, by changing (that is, canceling the change) the validation area AR of the touch panel 130 to the original state, it is possible to suitably detect the input without limiting the detection sensitivity and the detectable area of the touch panel 130.

In the first operation example, it has been exemplified that the processor 110 changes the validation area of the touch panel 130 based on whether the near-field communication using the NFC antenna 120 is in progress. However, the present disclosure is not limited thereto. For example, the processor 110 may change the validation area of the touch panel 130 based on whether the NFC mode is set as the operation mode.

Figure 8:
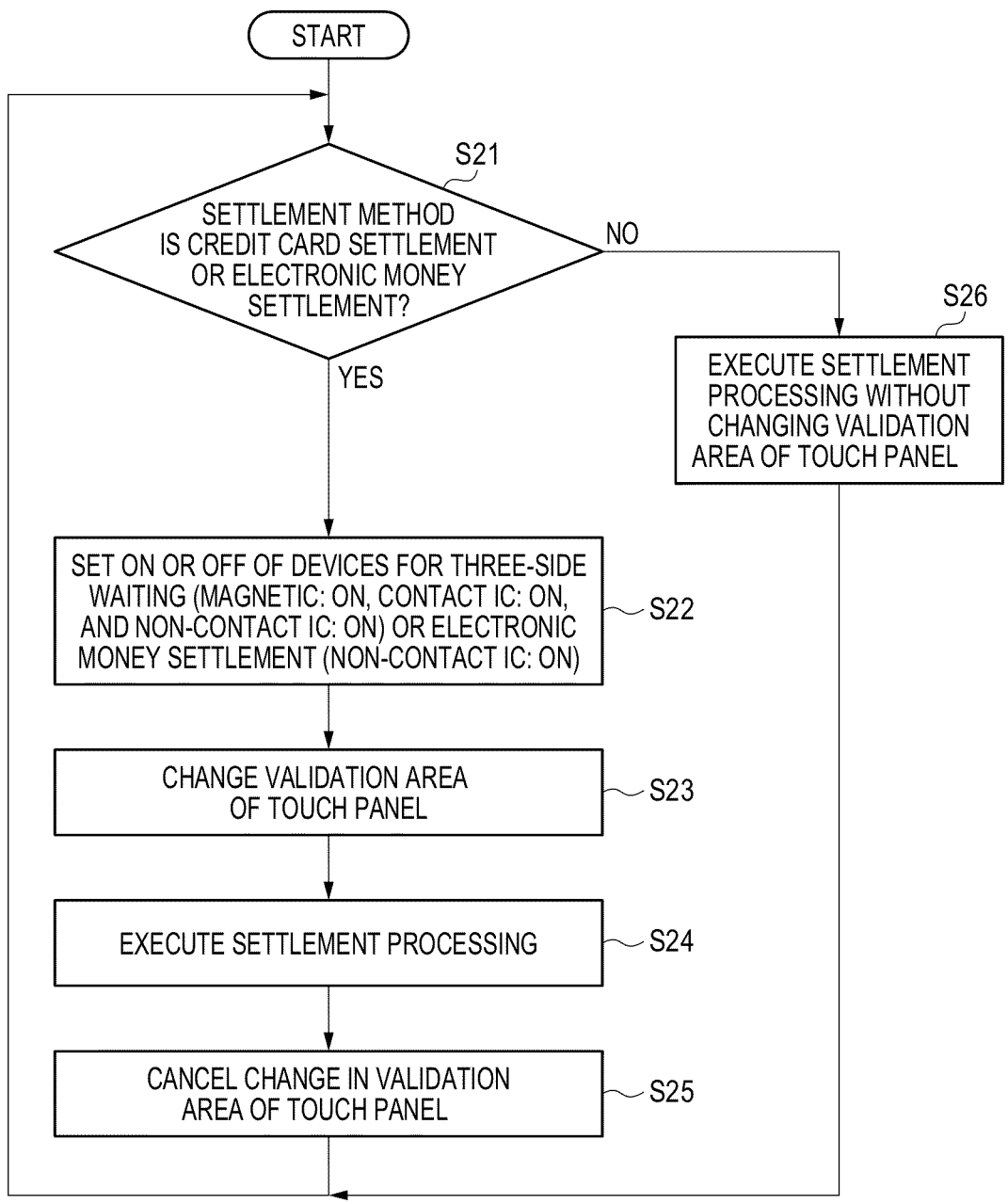
FIG. 8 is a flowchart showing a second operation example of the electronic apparatus.

FIG. 8 is a flowchart showing a second operation example of the electronic apparatus 100. FIG. 8 shows that the validation area of the touch panel 130 is controlled when the electronic apparatus 100 executes the settlement processing.

First, the processor 110 selects a settlement method (S21). In this case, for example, the store clerk or the customer (the purchaser) operates the touch panel 130, the touch panel 130 receives the input operation, and the processor 110 selects the settlement method according to this input operation.

When the credit card settlement is selected as the settlement method, the processor 110 sets on or off of the devices for executing three-side waiting. The three-side waiting is a state in which the electronic apparatus 100 can read any of the three cards (the magnetic card C1, the contact IC card C2, and the non-contact IC credit card C31) having the credit card function. Specifically, the processor 110 turns on the power of the first card reader 16 (magnetic: ON), turns on the power of the second card reader 17 (contact IC: ON), and turns on the power of the NFC_IC 14 (non-contact IC: ON) (S22). Accordingly, the NFC antenna 120 can execute a near-field communication.

When the electronic money settlement is selected as the settlement method, the processor 110 turns on the power of the NFC_IC 14 (non-contact IC: ON) (S22). Accordingly, the NFC antenna 120 can execute a near-field communication.

Subsequently, the processor 110 changes the validation area AR of the touch panel 130 (S23). In this case, the processor 110 changes the divided detection area SDR1 from the validation area AR to the invalidation area IR. That is, the processor 110 changes a state in which both the divided detection area SDR1 and the divided detection area SDR2 are the validation area AR to a state in which only the divided detection area SDR2 is the validation area AR.

Subsequently, when the non-contact IC card C3 is brought close to the electronic apparatus 100, the processor 110 executes the near-field communication between the NFC antenna 120 and the non-contact IC card C3, reads information from the non-contact IC card C3, and acquires this information as non-contact read information. The processor 110 executes the settlement processing using the acquired non-contact read information (S24). The settlement processing is executed by the processor 110 of the electronic apparatus 100 and the settlement server of the settlement center in cooperation.

In this settlement processing, for example, the following processing is executed. The processor 110 encrypts the non-contact read information, and transmits the settlement request information including the encrypted non-contact read information to the settlement server via the communication unit 28. The settlement request information may include, for example, an identification number of a credit card and a settlement amount. The settlement server receives the settlement request information from the electronic apparatus 100, collates such information with the information held by the settlement server, and determines whether to permit settlement using the non-contact IC card C3 attempting the settlement. When the settlement is permitted, the settlement server executes the settlement using the non-contact IC card C3, and completes the transaction for purchasing the product or the service. The settlement server transmits a settlement completion notification to the electronic apparatus 100. When receiving the settlement completion notification via the communication unit 28, the processor 110 completes the settlement processing. The flow of the settlement processing is not limited to this example.

When the settlement processing is completed, the processor 110 cancels the change in the validation area AR of the touch panel 130 (S25). In this case, the processor 110 changes the divided detection area SDR1 from the invalidation area IR to the validation area AR. That is, the processor 110 changes a state in which only the divided detection area SDR2 is the validation area AR to a state in which both the divided detection area SDR1 and the divided detection area SDR2 are the validation area AR.

On the other hand, when the code settlement or the cash settlement is selected as the settlement method in step S21, that is, when the settlement method not using the NFC antenna 120 is selected, the processor 110 turns off the NFC_IC 14 (non-contact IC: OFF). Accordingly, the NFC antenna 120 becomes unable to execute the near-field communication. Then, the processor 110 does not change the validation area AR of the touch panel 130, maintains the state in which the entire area of the touch panel 130 is validated, and executes the settlement processing such as code settlement or cash settlement (S26).

After the processing in step S25 or step S26, the processor 110 proceeds to the processing in step S21 again, and repeats the processing in FIG. 8.

According to the second operation example of the electronic apparatus 100, when the settlement method of credit card settlement or electronic money settlement is selected, the electronic apparatus 100 turns on at least the NFC_IC 14 and changes the validation area of the touch panel 130. In the second operation example, in a state in which the non-contact IC card C3 is not brought close to the electronic apparatus 100, the electronic apparatus 100 can also prevent the touch panel 130 from being electrically interfered due to a polling signal for detecting the non-contact IC card C3 issued by the NFC antenna 120. When executing the settlement not using the near-field communication according to the NFC antenna 120, the touch panel 130 can be used without any particular restriction on the detection executed by the touch panel 130 and without reducing the detection sensitivity of the touch panel 130.

When the validation area is changed as in step S13 in FIG. 7 or step S23 in FIG. 8, the processor 110 may display this validation area. For example, the processor 110 causes the touch panel 130 to display the entire area of the touch panel 130 and the validation area in the touch panel 130, so that the user can easily grasp the validation area. The electronic apparatus 100 may include a speaker, and information of the validation area may be output by a sound such as a voice. According to such a sound output, the user can easily grasp the validation area.

Similarly, as in step S15 in FIG. 7 or step S25 in FIG. 8, when the change of the validation area is canceled, the processor 110 may display the validation area after the cancel. For example, the processor 110 causes the touch panel 130 to display the entire area of the touch panel 130 and the validation area after the cancel in the touch panel 130 in a distinguishable manner (by, for example, surrounding the validation area with a frame or coloring the validation area), so that the user can easily grasp the validation area after the cancel. The electronic apparatus 100 may include a speaker, and information of the validation area after the cancel may be output by a sound such as voice. According to such a sound output, the user can easily grasp the validation area after the cancel.

As described above, in the electronic apparatus 100 according to the present embodiment, when the touch panel 130 and the noise source (for example, the NFC antenna 120) are arranged at a closer distance, for example, in a positional relationship in which the touch panel 130 and the noise source overlap each other, it is also possible to prevent the erroneous operation due to the interference of the communication radio wave or the like with the capacitance value of the touch panel during the operation of the noise source. Therefore, the electronic apparatus 100 can prevent the erroneous detection of the input executed by the touch panel 130 while enabling the near-field communication using the NFC antenna 120. Therefore, it is not necessary to provide the touch panel 130 and the noise source at physically separate positions, and it is possible to reduce the size of the electronic apparatus 100 and prevent the erroneous detection of the input executed by the touch panel 130.

OVERVIEW OF EMBODIMENT OF THE PRESENT DISCLOSURE

As described above, at least the following matters are described in the present disclosure. Components corresponding to those in the above embodiment are shown in parentheses, but the present disclosure is not limited thereto.

(1) An electronic apparatus (an electronic apparatus 100) including:

a touch panel (a touch panel 130) for electrically detecting an input operation;

an antenna for near-field communication (an NFC antenna 120) having a communicable area (a communicable area NR) that overlaps at least a part of a detection area (a detection area DR) of the touch panel;

a memory storing instructions; and a processor (a processor 110) that implements the instructions to reduce a detection sensitivity in a first detection area (a divided detection area SDR1) overlapping with the communicable area in the touch panel when a near-field communication is in progress by the antenna for near-field communication or when a near-field communication is possible by the antenna for near-field communication.

Accordingly, in the electronic apparatus, even when the touch panel and a member that may electrically interfere therewith are provided close to each other, when a near-field communication is in progress or when a near-field communication is possible, the touch panel is less likely to detect the input, and thus the erroneous operation of the touch panel can be prevented.

(2) The electronic apparatus according to (1), in which the touch panel includes the first detection area and a second detection area (a divided detection area SDR2) not overlapping with the communicable area in the touch panel, and in which the processor validates detection in the second detection area and invalidates detection in the first detection area when a near-field communication is in progress by the antenna for near-field communication or when a near-field communication is possible by the antenna for near-field communication.

Accordingly, the electronic apparatus invalidates the first detection area and changes the validation area of the touch panel, thereby being capable of preventing the erroneous operation of the touch panel while ensuring a state in which the operation of the second detection area of the touch panel, where the electrical interference with the antenna for near-field communication is unlikely to occur, can be detected.

(3) The electronic apparatus according to (2), in which, when the near-field communication is completed by the antenna for near-field communication, the processor cancels the invalidation of the detection in the first detection area.

Accordingly, since it is not the timing for the electronic apparatus to execute the near-field communication by the antenna for near-field communication, it is possible to prevent the erroneous operation of the touch panel even when the invalidation of the first detection area is canceled, the change in the validation area of the touch panel is canceled, and the operation can be detected in the entire area of the touch panel.

(4) The electronic apparatus according to any one of (1) to (3), in which, when a near-field communication mode (an NFC mode) that a near-field communication executed by the antenna for near-field communication is possible is set, or when a power of an antenna control circuit (an NFC_IC 14) configured to control the antenna for near-field communication is turned on, the near-field communication is possible.

Accordingly, when the electronic apparatus is in various states in which the near-field communication is possible, the erroneous operation of the touch panel can be prevented before the near-field communication is actually executed.

(5) The electronic apparatus according to (4), in which the processor is configured to execute predetermined settlement processing, and turns on the power of the antenna control circuit when a credit card settlement method or an electronic money settlement method is selected as a settlement method for executing the settlement processing.

Accordingly, in the electronic apparatus, when the settlement method using the antenna for near-field communication is selected, the detection sensitivity in the first detection area of the touch panel is reduced, thereby preventing the erroneous operation of the touch panel while executing the settlement processing.

(6) The electronic apparatus according to (5), further including:

a magnetic card reader (a first card reader 16) configured to read a magnetic card (a magnetic card C1), and a contact IC card reader (a second card reader 17) configured to read a contact IC card (a contact IC card C2), in which, when the credit card settlement method is selected, the processor turns on the magnetic card reader, the contact IC card reader, and the power of the antenna control circuit.

Accordingly, when the credit card settlement method is selected, the electronic apparatus lowers the detection sensitivity in the first detection area of the touch panel even when the magnetic card, the contact IC card, and the non-contact IC card are in a usable state and are in a state of three-side waiting. Therefore, the electronic apparatus can easily execute settlement using any of the cards described above, and can prevent the erroneous operation of the touch panel at the time of settlement.

(7) The electronic apparatus according to (2), in which the processor redisplays an operation button (an operation button MB) configured to receive an input operation in the validated second detection area in the touch panel.

Accordingly, the electronic apparatus can secure a state in which the operation of the operation button can be performed by redisplaying the operation button in the second detection area in which the input can be detected, instead of the first detection area in which the detection of the input is impossible due to the invalidation.

(8) A method for controlling an electronic apparatus including a touch panel for electrically detecting an input operation and an antenna for near-field communication having a communicable area that overlaps at least a part of a detection area of the touch panel, the method including:

reducing a detection sensitivity in a first detection area which is a detection area that overlaps the communicable area in the touch panel when a near-field communication is in progress by the antenna for near-field communication or when a near-field communication is possible by the antenna for near-field communication.

Accordingly, in the electronic apparatus, even when the touch panel and a member that may electrically interfere therewith are provided close to each other, the touch panel is less likely to detect the input, and thus the erroneous operation of the touch panel can be prevented.

Although various embodiments are described above with reference to the drawings, it is needless to say that the present disclosure is not limited to such examples. It is apparent that those skilled in the art can conceive of various modifications and alterations within the scope described in the claims, and it is understood that such modifications and alterations naturally fall within the technical scope of the present disclosure. The components in the above embodiment may be freely combined without departing from the scope of the invention.

In the above embodiment, a program for implementing the function of the method for controlling an electronic apparatus may be supplied to the electronic apparatus (for example, the settlement terminal) which is a computer via a network or various storage media, and a program that is read and executed by the processor of this electronic apparatus and a recording medium in which this program is stored may be used as the application range.

In the above embodiment, the processor may be physically implemented in any manner. When a programmable processor is used, a processing content can be changed by changing a program, and thus a degree of freedom in designing the processor can be increased. The processor may be implemented by one semiconductor conductive chip or may be physically implemented by a plurality of semiconductor conductive chips. In the case of the plurality of semiconductor conductive chips, controls according to the above embodiment may be implemented by different semiconductor conductive chips. In this case, it can be considered that one processor is implemented by the plurality of semiconductor conductive chips. The processor may be implemented by a member (a capacitor or the like) having a function different from that of the semiconductor conductive chip. One semiconductor conductive chip may implement functions of the processor and other functions. A plurality of processors may be implemented by one processor.

INDUSTRIAL APPLICABILITY

The present disclosure is useful in an electronic apparatus and a method for controlling an electronic apparatus that can prevent an erroneous operation of a touch panel even when an antenna for near-field communication is provided in the vicinity of the touch panel.

What is claimed is:
1. An electronic apparatus, comprising:
a touch panel for electrically detecting an input operation; and
an antenna for near-field communication, the antenna having a communicable area that overlaps at least a part of a detection area of the touch panel;
a memory storing instructions; and
a processor that implements the instructions to
reduce a detection sensitivity in a first detection area of the communicable area that overlaps with the touch panel when the near-field communication is in progress by the antenna or when the near-field communication is possible by the antenna,
wherein the touch panel includes the first detection area and a second detection area not overlapping with the communicable area in the touch panel, and
the processor implements the instructions to validate detection in the second detection area and invalidate detection in the first detection area when the near-field communication is in progress by the antenna or when the near-field communication is possible by the antenna.

2. The electronic apparatus according to claim 1,
wherein, when the near-field communication is completed by the antenna, the processor implements the instructions to invalidate the detection in the first detection area.

3. The electronic apparatus according to claim 1,
wherein, when a near-field communication mode that indicates the near-field communication executed by the antenna is possible is set, or when a power of an antenna control circuit configured to control the antenna for the near-field communication is turned on, the near-field communication is possible.

4. The electronic apparatus according to claim 3,
wherein the processor is configured to execute settlement processing, and
the processor implements the instructions to turn on the power of the antenna control circuit when a credit card settlement method or an electronic money settlement method is selected for executing the settlement processing.

5. The electronic apparatus according to claim 4, further comprising:
a magnetic card reader capable of reading a magnetic card; and
a contact IC card reader capable of reading a contact IC card,
wherein when the credit card settlement method is selected, the processor implements the instructions to turn on the magnetic card reader, the contact IC card reader, and the power of the antenna control circuit.

6. The electronic apparatus according to claim 1,
wherein the processor implements the instructions to redisplay an operation button configured to receive an input operation in the second detection area in the touch panel.

7. A method for controlling an electronic apparatus, the electronic apparatus comprising:
a touch panel for electrically detecting an input operation; and
an antenna for near-field communication, the antenna having a communicable area that overlaps at least a part of a detection area of the touch panel, the method comprising:
reducing a detection sensitivity in a first detection area of the communicable area that overlaps with the touch panel when the near-field communication is in progress by the antenna or when the near-field communication is possible by the antenna,
wherein the touch panel includes the first detection area and a second detection area not overlapping with the communicable area in the touch panel, and
the processor implements the instructions to validate detection in the second detection area and invalidate detection in the first detection area when the near-field communication is in progress by the antenna or when the near-field communication is possible by the antenna.

* * * * *